United States Patent [19]

Healey et al.

[11] 3,868,644

[45] Feb. 25, 1975

[54] STACK MECHANISM FOR A DATA PROCESSOR

[75] Inventors: Robert A. Healey, Endicott; Everett M. Shimp, Endwell, both of N.Y.

[73] Assignee: International Business Machines Corporation, Armonk, N.Y.

[22] Filed: June 26, 1973

[21] Appl. No.: 373,847

[52] U.S. Cl. .......... 340/172.5
[51] Int. Cl. .......... G06f 13/06
[58] Field of Search .......... 340/172.5; 444/1

[56] References Cited

UNITED STATES PATENTS

| | | | |
|---|---|---|---|
| 3,245,047 | 4/1966 | Blaauw et al. | 340/172.5 |
| 3,287,705 | 11/1966 | Rosenblatt et al. | 340/172.5 |
| 3,401,376 | 9/1968 | Barnes et al. | 340/172.5 |
| 3,546,677 | 12/1970 | Barton et al. | 340/172.5 |
| 3,654,621 | 4/1972 | Bock et al. | 340/172.5 |

*Primary Examiner*—Gareth D. Shaw
*Assistant Examiner*—John P. Vandenburg
*Attorney, Agent, or Firm*—John C. Black

[57] ABSTRACT

A storage device (hereinafter referred to as a high speed store) includes a plurality of registers or locations and has an access speed compatible with that of its processor. Operands and/or operators are entered into one group of said registers hereinafter referred to as a high speed stack (a push operation) and removed therefrom (a pop operation) for processing in a last-in-first-out order. The number of entries stored in the stack at any moment can become very large due to the nesting of operators. Since it is not economically feasible to provide a large capacity high speed stack, overflow of the stack into a slower speed storage device (hereinafter called a low speed stack) is provided. "Roll out" of entries to the low speed stack and "roll in" of the entries back to the high speed stack is effected as the high speed stack becomes full and empty. A backup register in the non-stack portion of the high speed store permits delay of roll out operations until the last possible moment. When a new entry is to be stored into the high speed stack (a push operation) and the stack is full, the new entry is put into the backup register, entries are rolled out from the high speed stack to the low speed stack and the new entry is then transferred from the backup register to the high speed stack. By means of pointers (stack addresses), pointer updating circuits and pointer controlled logic, entries rolled out to the low speed stack are still valid and available in the high speed stack for processing until they are either popped out or overlaid by new entries. This significantly reduces the number and frequency of roll out and roll in operations.

7 Claims, 27 Drawing Figures

STACK MECHANISM FOR A DATA PROCESSOR

BACKGROUND OF THE INVENTION

This invention relates to data processors which are organized so as to operate according to a machine language which is closely related to high level problem program languages. One example of such a processor is shown in U.S. Pat. No. 3,200,379.

The improvement is directed to the control means and method for transferring entries within a last-in-first-out stack mechanism contained in two different speed storage media in such a data processing system. More specifically, the improvement minimizes roll out and roll in operations between the two storage media.

In any processor using a stack mechanism to store operators and/or operands, it is desirable to have the stack contained in a storage media with a speed compatible to the speed of the processor itself. This is not always economically feasible because the number of entries on the stack can become very large due to the nesting of operators.

The conventional solution for this is to have some fixed number, X, of high speed storage locations and allow any overflow to be contained in a slower speed storage media. Normal operation when high speed storage is full, is to roll out its X entries into the slower speed storage. Now the high speed storage locations are again available for storing (pushing) X number of entries onto the stack.

When reading (popping) entries from the stack for processing, the procedure is reversed. When the high speed storage contains no more valid entries, X entries are rolled in from the slow speed storage. This method requires only two pointers; the stack top pointer (STP) for the high speed storage, and the slow speed storage pointer (SSP).

The difficulty with the above method is that the program being processed may enter a mode of operation that requires alternate push and pop operations which in turn require a roll out and roll in for each operation. Considerable degradation of system performance results from excessive roll out, roll in operations.

Another proposal is shown in U.S. Pat. No. 3,401,376. In this patent, the high speed stack includes a store for twelve entries and two hardware registers for the top two entries. As soon as the store is full, four entries are transferred to a low speed store. When the high speed store has less than four entries, four entries are rolled in from the low speed store. All pop or push operations require transfer between the registers and between one of the registers and the high speed store. A copending application, Ser. No. 299,499, filed Oct. 20, 1972, and assigned to the same assignee as the present application, describes a stack processor wherein means including a backup register permits the delay of roll out and roll in operations until they are absolutely required, thereby substantially reducing the number of such operations.

A "stack" is a chronologically ordered series of events or data. A reference pointer STP is maintained which points to the most recent entry or the stack top. When a new entry is entered into the stack, the pointer STP is incremented to point to the new entry. The new entry is said to be pushed on the stack and becomes the new stack top. Therefore, to push an entry onto a stack is to add a member to the series.

Only the latest entry to the stack may be removed. At the start of this operation, this entry is the current stack top. To remove an entry, the pointer STP is decremented and the stack entry becomes invalid for future use. This action is referred to as popping the stack.

Theoretically, a stack can obtain an unlimited number of entries. However, any stack entry requires some storage space. Therefore, a computer system design which implements a stacking mechanism will place some physical constraints on the number of entries for reasons of both cost and performance. Although a physical implementation of a stack will require a limit to be placed on the total number of stack entries, it is also desirable for the number to be as large as costs will allow. This implies that the bulk of the entries of a particular stack will be stored in the systems' main storage and in fact all of the entries could reside in main storage.

Because a stack focuses on the current stack top and because it grows and shrinks with reference to the top, the most recent entries of a stack become the most active and thus most heavily accessed. To improve the performance characteristics of a stacking mechanism, these most-recent entries can be implemented internal to the system hardware, and as such, become a faster extension of the main storage. To become an extension of main storage, the internal addressing of the internal stack entries must take on certain binary boundary characteristics similar to main storage addressing. A straight forward implementation of the internal extension would be to keep internally, 16 entries on 16-entry boundaries. This is to say that initially the first 16 entries would be kept internally and when the 17th entry was pushed onto the stack, then (1) the first 16 entries would be rolled out into main storage and (2) the 17th entry would take the position in the internal hardware (i.e., high speed stack) previously occupied by the first entry. After 16 more entries were pushed onto the stack, again a 16-entry boundary would be crossed and another roll out from internal hardware (high speed stack) to main storage would take place.

Conversely, if entries were removed from the stack, eventually the pointer STP would be decremented past a 16-entry boundary and 16 entries in main storage would be rolled back into the internal hardware. Whenever a group of entries is either rolled out or rolled in, the system is not doing any productive work. Therefore, in this implementation just described, if the program being executed caused entries to be pushed and then popped while the pointer STP was sitting at a boundary point, roll out followed by roll in would occur on every operation. This causes a situation called thrashing in which much time is spent moving entries back and forth, and very little time is spent in actual execution of the currently running program. It is this problem that the present improvement prevents.

SUMMARY OF THE INVENTION

The improvement described herein is designed to roll out when the total number of push operations exceeds the internal hardware (i.e., high speed stack) capacity of 16 entries. Conversely, roll in will occur only when the total number of pop operations exceeds the push operations to the extent that no valid entries remain in the high speed stack.

A plurality of pointers (stack pop pointer SPP, stack valid pointer SVP and stack top pointer STP) and status bits V (for roll-in) and T and P (for roll-out) are used to achieve the desired mode of operation.

In the preferred embodiment, roll in and roll out always transfers a full 16 entries (if available) irregardless of where the 16-entry boundary point lies in the main storage stack. However, the invention is not limited to this method of operation.

A stack pop pointer (SPP) normally indicates the position of the earliest entry in the high speed stack which does not have a duplicate copy in the slow speed stack in main storage. Since the high speed stack has room for 16 entries in locations HS0 through HS15, subsequent entries overlay data in corresponding locations in the high speed stack. The first 16 entries A–P are stored in the high speed stack. Since location HS0 contains the first entry A, the pointer SPP is initially set to 0 to indicate the earliest entry therein. When the 17th entry Q is pushed onto the stack, then (1) the first 16 entries A through P are rolled out into the main storage stack and (2) the 17th entry Q then takes the location HS0 previously occupied by the first entry A. Pointer SVP is incremented to point to high speed stack location HS1 having the earliest entry B stored therein.

The condition for signaling a roll out is the following: If the operation is Push and the current value of the stack top pointer STP (before incrementing) is one less than the current value of SPP, then roll out is signaled.

This condition occurs when there has been an excess of 16 push operations over pop operations and the current push operation is about to overlay the earliest internal hardware entry indicated by the pointer SPP. To complete the discussion of roll out, first the movement of the pointer SPP and secondly the storage starting address must be described.

As stated previously, since the initial stack entry is always made at location HS0, the pointer SPP is initialized to 0. An example will help to illustrate the movement of the pointer SPP. Assume the configuration of the high speed and low speed stacks after 18 entries A–R have been pushed on the high speed stack, and one roll out of 16 entries A–P to the low speed stack has taken place. Entries Q, R are in locations HS0, HS1 and copies of entries C–P still remain in locations HS2–HS15. Starting from this point, assume the removal or popping of 4 entries R, Q, P, O. The pointer STP was originally pointing to location HS1 and then was decremented on each of the four pop operations. It then correctly points at location 13. When the pointer STP is decremented past the location HS0 indicated by the pointer SPP, because of successive pop operations, the pointer SPP starts to follow the pointer STP to remember the location which will receive the earliest new entry when operations return to push mode. When the pointer STP is decremented from 15 to 14, the pointer SPP is decremented from 0 to 15. The condition for updating the pointer SPP is the following: If the operation is Pop and the current value of pointer SPP equals the current value of the pointer STP + 1, then the pointer SPP takes on the current value of pointer STP (SPP is decremented by 1) before the pointer STP is decremented to complete the pop operation.

When the execution switches from pop operations back to push operations, the pointer SPP which was following the pointer STP will not change because pointer STP is now incremented for the push operations. The pointer SPP will thus point to the beginning of the new entries.

Because of the previous definition for signaling roll out, a problem exists on the first push operation following a series of pop operations if the pointer SPP has been following the pointer STP. On the first push operation, the current value of pointer STP is one less than the value of pointer SPP, which was previously stated to be the condition for signaling a roll out. This condition, however, does not represent the 17th entry to be pushed but instead is the first entry of a series. Therefore, for the hardware to be able to differentiate between these two conditions, a status bit T is introduced to inhibit the roll out signal.

Bit T is defined to inhibit the roll out signal whenever the bit is a logical 1. Therefore, the condition for signaling a roll out becomes: If the operation is push, bit T is a logical 0, and the current value of pointer STP (before incrementing) is one less than the current value of pointer SPP, then roll out is signaled.

Bit T is initialized to a value of 0. The condition for setting the bit to 1 is as follows: If the operation is pop and the current value of pointer STP (before decrementing) is equal to the current value of pointer SPP, then bit T is set to a 1.

Likewise the bit T is reset when stack top (i.e., pointer STP) becomes equal to the pointer SPP during a push operation. The condition for resetting bit T is thus the following: If the operation is push, and the updated value of pointer STP equals the current value of pointer SPP, then bit T is reset to 0.

The condition for signaling roll out is checked before the changing of bit T so that if bit T does return to a logical zero during a push operation, a roll out will not be signaled erroneously. Bit T also serves one additional purpose. The previously defined condition for updating the pointer SPP neglects one situation. Assume 16 push operations to store entries A–P into stack locations HS0–HS15. If at this point the next event was a pop operation, the rule for updating pointer SPP would be met and pointer STP would be decremented to 14 and pointer SPP would be decremented to 15. However, the pointer SPP should not start to follow the pointer STP unless the pointer STP becomes equal to the pointer SPP during a preceding pop operation. Bit T is not set to a logical 1 state until this condition is met. Therefore, the exact condition for updating pointer SPP is the following: If the operation is Pop, bit T is a logical 1, and the current value of pointer SPP equals the current value of pointer STP + 1, then pointer SPP takes on the current value of pointer STP (SPP is decremented by 1) before pointer STP is decremented to complete the operation.

The main storage starting address $MSA_N$ for roll out is calculated as follows:

$$MSA_N = \text{Modulo}_{16}\,[MSA_0 = 1 - (P \times 16)] + SPP$$

where $MSA_0$ is an initialized address from the preceding roll in or roll out, and bit P is a status bit described in detail below.

Modulo 16 is illustrated by the following table, wherein for example the value of $\text{Modulo}_{16}(N)$ is 0 whenever N is any number from 0–15 inclusive.

MODULO 16 TABLE

| RANGE OF N LOW | HIGH | $MODULO_{16}(N)$ |
|---|---|---|
| 0 | 15 | 0 |
| 16 | 31 | 16 |
| 32 | 47 | 32 |
| ↓ | ↓ | ↓ |

The modulo 16 component of the storage starting address gives the base element for a group of 16 entries in main storage while the pointer SPP provides the offset into the group. The pointer SPP ranges from 0 to 15 so it cannot overflow into the next module of 16 entries.

The Main Storage Pointer is the main storage address of the most current stack entry in main storage. In the case of a previous roll out, it points at the last entry which was transferred from the high speed stack to main storage. If the preceding storage operation had been a roll in, the Main Storage Pointer was set to the address of the first entry transferred back from the main storage to the high speed stack. The calculation of the storage starting address for roll in will be defined later.

The pointer SPP is always pointing at the correct displacement within a group of 16 entries at the time a roll out is signaled. However, the Main Storage Pointer may not be pointing within the correct group of 16 entries. The Main Storage Pointer is updated only at roll out or roll in time and therefore is not changing during push or pop operations in the high speed stack. For example, assume operation from an initialized condition of 17 push operations and a first roll out of 16 entries to main store locations MS0–MS15. If now 16 more push operations are executed, the condition for roll out is again signaled and the correct main storage starting address would be the next location in storage, which in this case would be address MS16. Bit P is initialized to a logical 0; and, as will be seen later, can change only as a result of a specific pop operation. With bit P at the value of 0, the expression for calculating the storage starting address yields the correct result of 16.

$$MSA_N + Modulo_{16}\,[MSA_0 + 1 - (P \times 16)] + SPP$$
$$= Modulo_{16}\,[15 + 1 - (\times 16)] + 0$$
$$= Modulo_{16}\,[16] + 0 = 16$$

Again assume an initialized condition, followed by the execution of 18 push operations to store entries A–P in the high speed store, roll out of copies of entries A–P to main store locations MS0–MS16 and then overlay of entries A, B by entries Q, R in the high speed stack locations HS0, HS1. Assume this is followed by 4 pop operations, thus invalidating entries R, Q, P, O. If 17 more push operations are now executed, pointer STP will equal pointer SPP (i.e., 14), and the conditions for roll out are again satisfied. The correct main storage starting address is in this case equal to 14 since the pop operations invalidated entries P, Q, and the main storage copy must be updated to reflect the new entries associated with locations MS14 and MS15. Using the same expression for calculating the storage starting address, it can be seen that the correct $Modulo_{16}$ base component of the address should in this case be 0 instead of 16. This is correctly computed because $MSA_0$ equals 15 and because bit P has the value of 1 as explained below.

The pointer SPP which trails the pointer STP on pop operations described in the example above changed from the value of 0 to 15 on the third pop operation. In doing so, it crossed a corresponding boundary, i.e., it points to data stored in a next lower group of 16 addresses in main storage below the group identified by $MSA_0$. In order to remember this condition, the bit P status bit is set to a logical 1. Therefore, the condition for setting bit P is as follows; If the operation is Pop, and as a function of the pop operation, the pointer SPP is decremented past a 16-entry boundary, then the bit is set to the value of 1.

The storage starting address expression thus gives the correct starting address of 14.

$$MSA_N = Modulo_{16}\,[MSA_0 + 1 - (P \times 16)] + SPP$$
$$= Modulo_{16}\,[15 + 1 - (1 \times 16)]\ 14$$
$$= Modulo_{16}\,[0\ ] + 14$$
$$= 14$$

For Storage Pointer values other than 15, the expression also yields correct starting addresses for the same definition of bit P and pointer SPP. Since, following either a roll out or a roll in, the Storage Pointer $MSA_0$ is updated to reflect the most current entry in main storage, then it follows that bit P should be reset to a logical 0 state as a result of either operation.

If 17 push operations are executed from an initialized state, roll out of the first 16 entries occurs, and the first entry is overlaid in the high speed stack by the 17th entry. Although the remaining 15 entries in high speed stack were copied into main storage, there is no need to delete them from their respective locations in the high speed stack. Therefore, if at this point in the program being executed, entries were removed (i.e., popped) from the high speed stack, there would be no reason to roll in any entries from main storage until the last valid entry on the stack had been removed. In order to take advantage of this condition, a stack-valid pointer (SVP) is implemented which points to the lowest valid entry on the stack. This pointer is initialized to zero at the start of program execution and will remain zero until the first 16-entry boundary has been crossed. When the 17th entry is pushed onto the stack and after the roll out to main storage has taken place, the pointer SVP is incremented by 1 for each successive entry pushed onto the stack. If there are intervening pop operations between successive push operations, the pointer SVP will not be incremented on every push. It is only incremented when the act of pushing causes a currently valid entry in the hardware to be overlaid by the new entry. The condition for updating pointer SVP is the following: If the operation is Push and if the current value of pointer SVP equals (STP + 1), then the current value of pointer SVP is incremented by 1.

If now enough pop operations were executed to cross the 16-entry boundary, there would be no need to have a transfer of entries back from main storage to the internal hardware stack. In fact, the condition for roll in does not monitor the 16-entry boundaries at all. By having the pointer SVP, the condition for roll in becomes: If the operation is Pop and if the current value of pointer SVP equals the current value of pointer STP, then the last valid entry has just been removed from the high speed stack. This then initiates the signal for roll in. If 17th and 18th entries overlay previous first and second entries in high speed store locations HS0 and HS1, the SVP pointer is incremented by one each time and points to location HS2 to point to the lowest valid entry remaining in the high speed stack.

When roll in of entries from main storage to the high speed stack is required, the calculation of the main storage starting address $MSA_N$ must be considered. The condition which initiates the roll in is the pointer STP being equal to the pointer SVP during a pop operation. Because of the similarities between the high speed stack addressing and the main storage stack addressing, the value of the pointing STP is in fact the relative offset into the last block of 16 entries rolled out to main storage stack. With this in mind, the storage starting address $MSA_N$ can be calculated to a point within the block of 16 entries so that only those entries which remain valid (have not been popped from the high speed stack) will be read into the high speed stack. Therefore, the starting address for roll in will be calculated as follows:

$MSA_N = \text{Modulo}_{16}\ [MSA_0 - (V \times 16)] + \text{STP updated}$ where V is a status bit, defined below.

The starting address $MSA_N$ having been calculated in this manner will then become the updated value of the Storage Pointer and then be used to read in the corresponding stack entries from the main storage stack into the high speed stack.

In the example immediately above wherein 18 entries were pushed on the high speed stack, the subsequent popping of 16 entries from the stack signals roll in. The starting address is calculated to have the value of 1, and the second and first entries are read from main storage into locations HS1 and HS0 respectively of the high speed stack. The correct starting address is calculated as follows:

$MSA_N = \text{Modulo}_{16}\ [15 - (0 \times 16)] \times 1$ $= \text{Modulo}_{16}\ [15] + 1 = 1 + 1 = 1$ In this case only two entries remained valid in main storage and were read in. If more than 16 valid entries remained in main storage, a full 16 entries would be transferred.

In order to obtain the correct value from the expression, it was required that a status bit V have the value of 0. Bit V serves much the same function for roll in as bit P served for roll out. Bit V keeps track of the correct group of 16 entries in main storage so that the storage pointer $MSA_0$ can be adjusted to yield the correct base component of the address calculation.

Bit V is initially reset to a logical 0. The conditions for setting bit V to a logical 1 are as follows: If (1) a roll out is signaled and the pointer SVP does not change from a 0 to a 1 or (2) a termination of roll in is signaled, then bit V is set to a 1.

To reset bit V to a logical 0, the following conditions must be met: If the operation is push, and the pointer SVP changes from a 0 to a 1, then bit V is reset to 0.

In other words bit V is reset whenever an entry is pushed onto the stack that crosses a 16-entry boundary point associated with main storage. Bit V is thus used to remember this condition for subsequent roll ins.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 2*a* and 2*b* are connected.

DESCRIPTION OF THE PREFERRED EMBODIMENT

Figure 1:
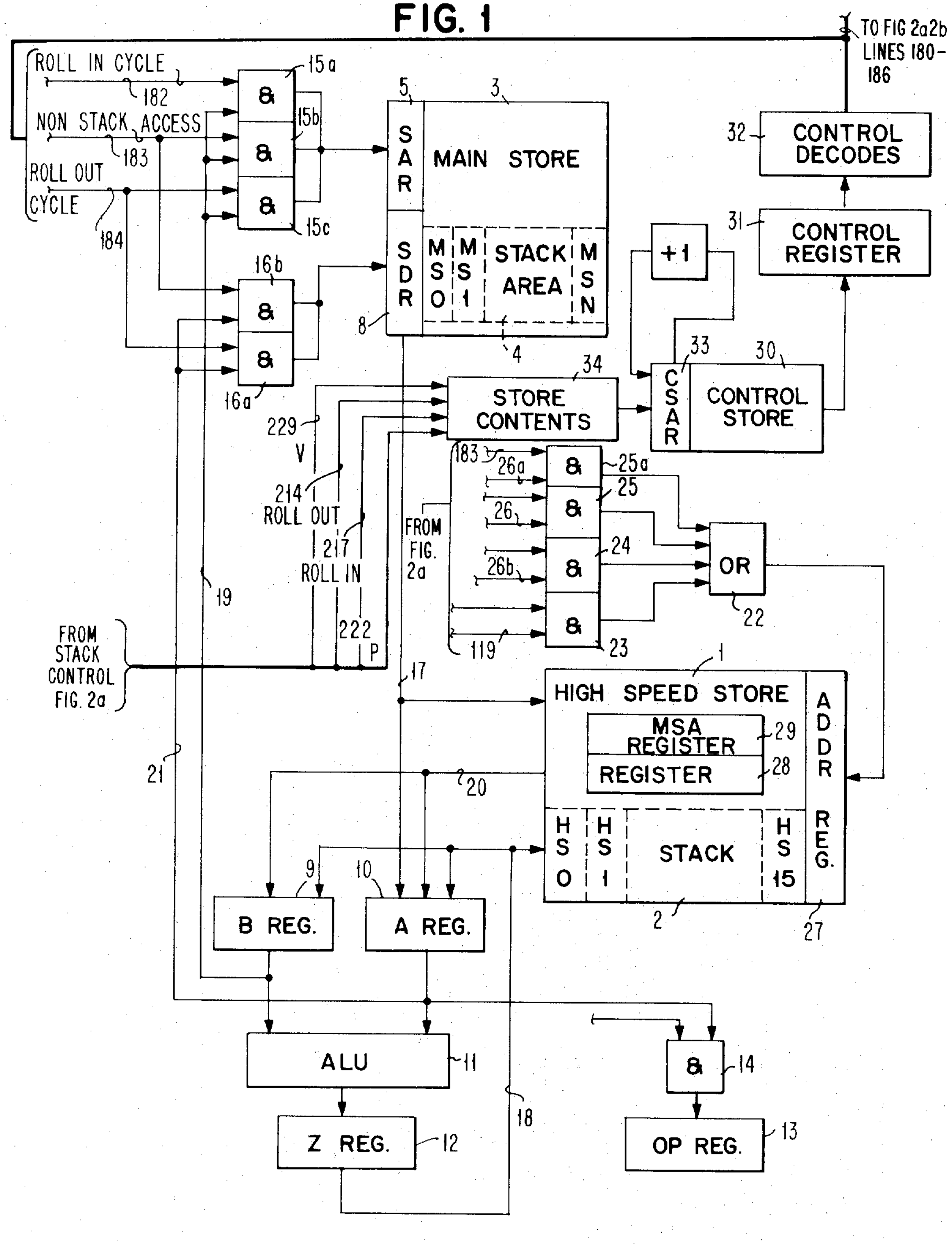
FIG. 1 illustrates a processor, stack mechanism and main store incorporating the present improvement.

The system illustrated diagrammatically in FIG. 1 preferably uses microprogram control and data paths generally of the type illustrated in detail in U.S. Pat. No. 3,656,123, issued Apr. 11, 1972, which patent is incorporated herein by reference. Gates controlled by the microprogram will not therefore be shown. Briefly the system includes a conventional main store 3 and a processor including an ALU (arithmetic and logic unit) 11 and a high speed local store 1 associated with the processor. Input A and B registers 9 and 10 are provided for the ALU 11 and a Z register 12 is provided at the ALU output. The processor is preferably of the type which is operated in accordance with microprogram control word routines which are held in a control store 30. As each control word is read from the store 30, it is entered into a control register 31. Control decode circuits 32 operate the processor through a machine cycle in response to each control word entered into the register 31. The decode circuits 32 and a clock (not shown) energize gating (AND) circuits (not shown) to perform calculations and to complete the data paths for effecting the transfer of data throughout the system in a known manner.

The processor utilizes a stack area 2 (hereinafter called stack 2) in the high speed store 1 to store operators/operands and uses a stack area 4 in the slower speed store 3 to store any stack overflow from the high speed store 1. In the preferred embodiment, stack 2 comprises locations or registers HS0–HS15 inclusive.

The stack 2 is accessed via OR circuit 22 and AND circuit 23 by a stack top pointer STP as will be seen later. The non-stack portion as well as the stack portion of store 1 is accessed via address bus 26, or 26*a* or 26*b*, OR circuit 22, and either AND circuit 24 or AND circuit 25 or AND circuit 25*a*.

A pointer STP in register 101 (FIG. 2*a*) is used to access the stack 2 only during push (store) and pop (read) operations. All such accesses are to the stack 2. All other accesses to the store 1 are by way of address bus 26 or bus 26*a* or bus 26*b*.

Store 3 has a plurality of word locations for storing entries including stack locations MS0–MSN. Bus 17 and input/output storage data register (SDR) 8 provide a path for data (operators/operands) from the store 3 to store 1 and register 10. During roll in operations from stack area 4 to stack 2, data is transferred via bus 17, directly to store 1. Bus 18 and a Z register 12 allow intermediate results of ALU 11 functions to be placed on (push) the stack 2 or returned to the A register 10 or B register 9 for further processing.

Store 1 has a plurality of word locations for storing entries, including stack locations HS0–HS15. Information from store 1 is read out on bus 20 to either the A register 10 or the B register 9. This information can be gated to the ALU 11 for arithmetic or logical operations. The output of the A register 10 is gated to the Op register 13 via AND circuit 14 when an operator entry is popped from the stack 2. The output of the A register 10 is gated via bus 21, AND circuit 16*a*, and the SDR register 8 to the stack area 4 of slow speed storage 3 on a roll out operation. Bus 21 and AND gate 16*b* provide a path from the register 10 to store 3 for non-stack data store operations.

A storage address register (SAR) 5 is used for addressing main store 3. The output of the B register 9 is gated via bus 19 and AND circuit 15*a* to the SAR register 5 for a roll in operation. For a roll out operation, B register 9 is gated to the SAR register 5 via bus 19 and AND circuit 15*c*. The non-stack area of main store 3 is addressed by gating B register 9 via path 19 and AND circuit 15*b* to the SAR register 5. Microprogram decode lines 182, 183, 184 control the gates 15*a*, 15*b*, 15*c*, 16*a*, 16*b*.

Figures 2, 2B:
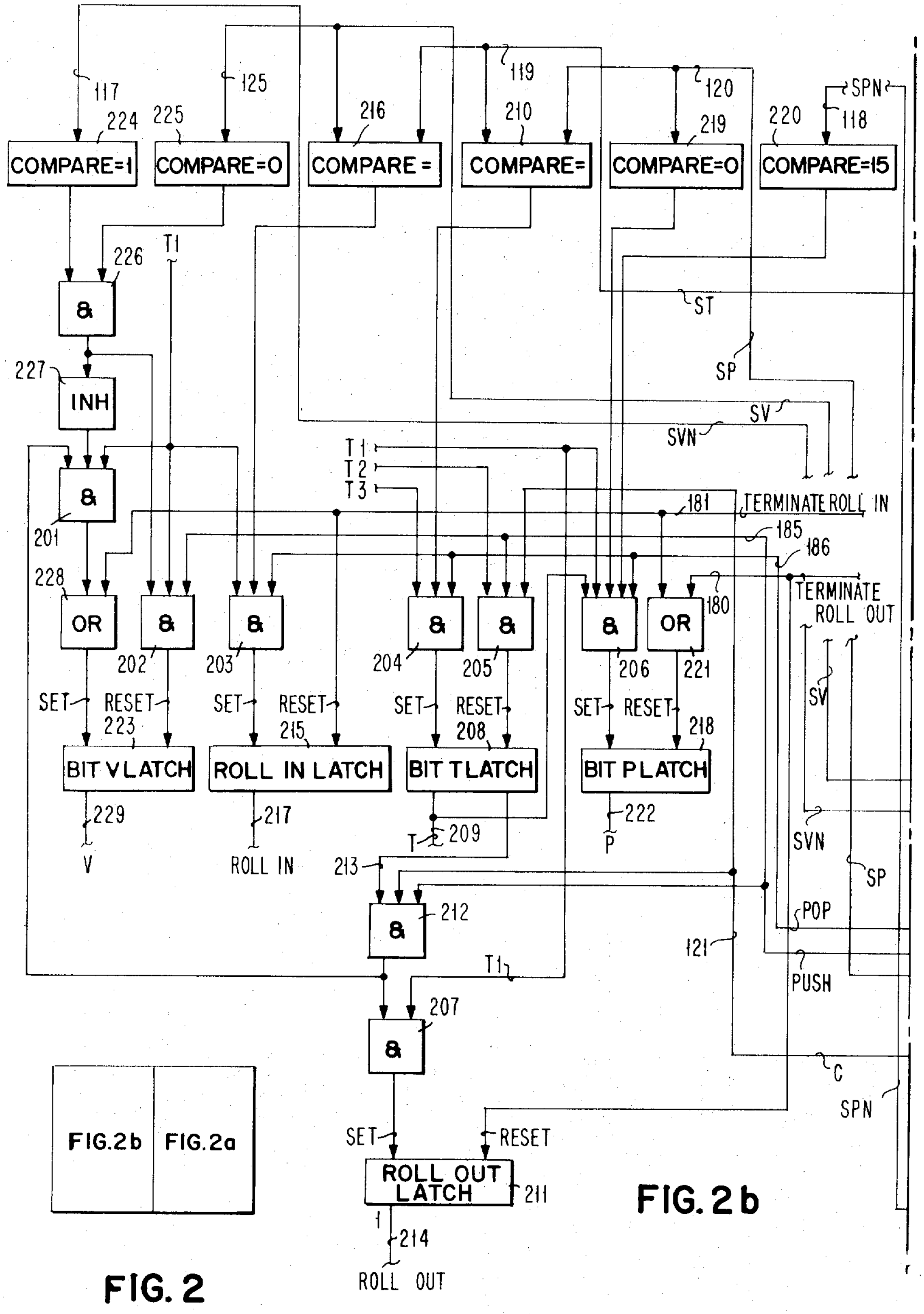
FIGS. 2*a* and 2*b* illustrate a preferred form of the improved stack addressing mechanism and roll in, roll out controls.
FIG. 2 shows how
Figure 2A:
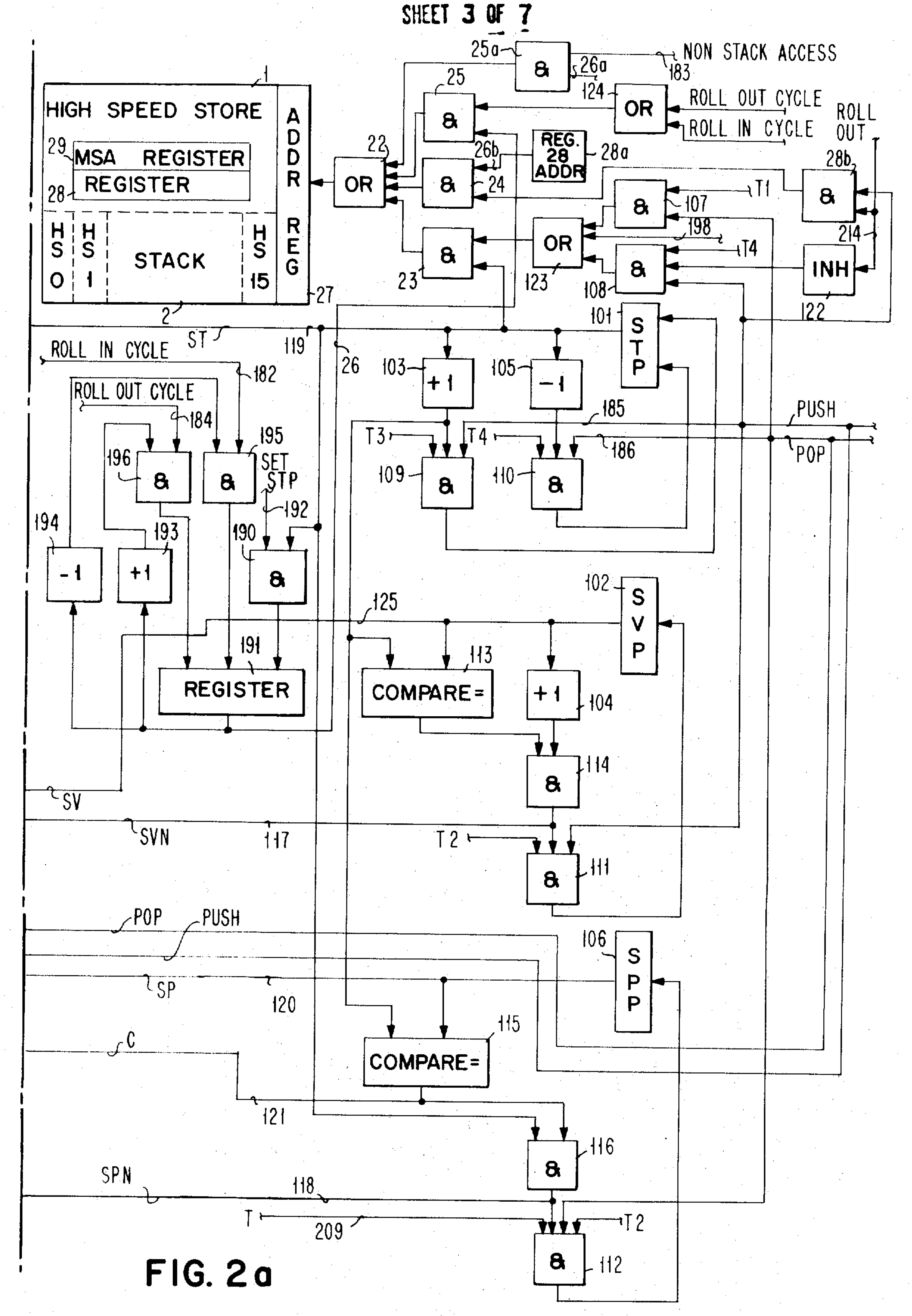

FIGS. 2*a* and 2*b* show the hardware necessary for addressing and control of the stack 2 in high speed storage 1.

The stack 2 requires $2^n$ entry positions in order to permit an economically feasible wraparound address updating mechanism (i.e., registers 101, 102, incrementers 103, 104, and decrementer 105) for pointers STP and SVP. For purposes of explanation, stack 2 is shown to contain $2^4$ or 16 entries, HS0–HS15.

Register 102 normally holds a pointer SVP to the earliest valid entry that was placed on stack 2. As will be shown later, there is one special circumstance when register 102 does not indicate this valid entry. Register 101 holds a pointer STP to the last valid entry that was placed on stack 2, i.e., the stack top.

Register 106 contains a pointer SPP to the earliest valid entry on stack 2 that does not have a duplicate copy in stack area 4 of main store 3. Unlike the registers 101 and 102, the register 106 frequently points to an invalid entry.

If register 106 points to a valid entry in stack 2, this was the first entry pushed onto stack 2 after all entries of stack 2 were rolled out to stack area 4. If register 106 points to an invalid entry in stack 2, it indicates a position that previously held an entry that was rolled out to stack area 4 and was later popped from stack 2 without an intervening roll in operation.

Since the correct operation of the hardware shown in FIGS. 2*a* and 2*b* requires a certain sequence of events, various AND gates (i.e., 107–112 and 201–207) are provided with sequential clock signals T1–T4.

Compare circuit 113 compares the incremented value of pointer STP in register 101, obtained via incrementer 103, to the present value of pointer SVP in register 102. If the two values are equal (STP + = SVP), AND circuit 114 gates the value from incrementer 104 (SVP + 1) to AND circuit 111 and compare circuit 224 via SVN bus 117. If a push operation is being performed, AND circuit 111 gates the value (SVP + 1) into register 102. The incrementing of SVP register 102 indicates that the push operation is going to overlay an entry in stack 2 that was previously rolled out to stack area 4 with a new valid entry.

Compare circuit 115 determines when STP + 1 = SPP. If these two values are equal, AND circuit 116 gates the value of STP in register 101 and on ST bus 119 to inputs of AND circuit 112 and compare circuit 220 via SPN bus 118. If a pop operation is being performed and bit T latch 208 has been set to bit T = 1, as indicated by T line 209, the value (STP) on line 118 is set into SPP register 106 via AND circuit 112.

The operation of setting the value of register 101 into register 106 on a pop operation is equivalent to decrementing register 106 (SPP = SPP − 1). This can only occur when SPP = STP + 1. This illustrates the instance mentioned above where the pointer SPP in register 106 indicates an invalid entry in stack 2.

Bit T latch 208 is set by AND circuit 204 during a pop operation if compare circuit 210 indicates that the value on ST bus 119 is equal to the value on SP bus 120, the comparison being STP = SPP. Bit T latch 208 is reset by AND circuit 205 during a push operation via C line 121 if compare circuit 115 indicates that STP + 1 = SPP.

Bit T latch 208 serves two functions. One is to control via T line 209 the setting of the STP register 101 value into SPP register 106. This should not occur until after the STP pointer value has come equal to the SPP pointer value. Thus the bit T latch 208 is not set unless compare circuit 210 indicates that STP = SPP.

The other function of bit T latch 208 is to inhibit the roll out signal. If line 209 indicates that bit T = 1, roll out latch 211 cannot be set via AND circuits 207 and 212. If bit T = 0, as indicated by line 213, and C line 121 indicates that STP + 1 = SPP, AND circuits 207 and 212 will set roll out latch 211 during a push operation.

As shown by the sequence of clock signals, roll out latch 211 is set by AND circuit 207 before bit T latch 208 is reset by AND circuit 205. Therefore the condition for signaling roll out is checked before changing bit T so that if bit T is reset during a push operation, a roll out will not be signaled erroneously. Roll out latch 211 is reset at the end of each roll out routine.

The setting of roll out latch 211 indicates that all entries in stack 2 are valid, none of these entries have been rolled out to stack area 4, and a push operation is in progress.

If line 214 does not indicate that latch 211 has been set, inhibit circuit 122 does not inhibit AND circuit 108 on a push operation. Thus AND circuit 108 and OR circuit 123 enable AND circuit 23 to gate the STP pointer value to the high speed store address register 27 via OR circuit 22.

If the roll out latch 211 has been set, line 214 causes inhibit circuit 122 to inhibit the above-mentioned operation. Instead, during this push operation, line 214 enables AND circuit 24 via AND circuit 28*b* to gate the address of register 28 from register 28*a* to address register 27 via OR gate 22. Since the push operation that set roll out latch 211 must be completed before the roll out routine can be started, the backup register 28 is required in store 1 to receive the entry being pushed when no available positions exist in stack 2.

During a pop operation, a valid entry always exists in stack 2. Thus AND circuit 107 and OR circuit 123 enable AND circuit 23 to gate the pointer STP from register 101 to address register 27 via OR circuit 22. All other values for address register 27 are obtained from bus 26 via OR circuit 22 when AND circuit 25 is enabled by OR circuit 124 or from bus 26*a* when AND circuit 25*a* is enabled by a microprogram decode signal on NON STACK ACCESS line 183 or via bus 26*b*, as described above.

The roll in latch 215 is used to indicate that the last valid entry in stack 2 will be removed during the present pop operation. Latch 215 is set by AND circuit 203 during a pop operation if compare circuit 216 detects via SV bus 125 and ST bus 119 that STP = SVP. This equal comparison occurs when the latest valid entry on stack 2, indicated by STP register 101, and the earliest valid entry on stack 2, indicated by SVP register 102, are the same. Roll in latch 215 is reset at the end of every roll in routine.

MSA register 29 in store 1 contains the main store address value or pointer MSA to be used to address stack area 4 of main store 3 during both roll out and roll in routines. In the case of a previous roll out routine, the main store address pointer MSA addresses the last entry which was transferred from stack 2 to stack area 4.

If the preceding operation had been a roll in routine, the main store address value MSA addresses the first entry that was transferred from stack area 4 to stack 2.

The MSA register 29 is updated only during a roll out or roll in routine and therefore is not changed during push and pop operations on stack 2. Since this stack implementation allows entries that were previously rolled out to stack area 4 to be popped from stack 2 without an intervening roll in operation and then overlaid with new entries by a push operation, and allows entries that were rolled in from stack area 4 to stack 2 to be overlaid with new entries by a push operation before these entries have been popped from stack 2, the value in MSA register 29 may need to be updated before it is used during a roll out or roll in routine.

For the roll out routine the need for an update (i.e., a correction factor) to MSA register 29 is indicated by bit P latch 218. When the output line 214 from latch 211 is in the logical one state, a microprogram routine in control store 30 is selected via store 34 to update the MSA register value before rolling out entries from stack 2 to stack 4. The routine tests the logical state of the P bit latch 218 to properly calculate the updated value of MSA.

Latch 218 is set by AND circuit 206 during a pop operation if compare circuit 219 indicates that SP bus 120 is equal to zero (value in SPP register 106 is pointing to entry position HS0 in stack 2), compare circuit 220 indicates that SPN bus 118 is equal to 15 (SPN bus 118 is pointing to entry position HS15 in stack 2) and T line 209 is at a logical 1 state to indicate that the value on the SPN bus 118 will be gated to the SPP register 106.

The setting of bit P latch 218 is thus done when during a pop operation the value in SPP register 106 is going to be decremented across a 16-entry boundary. This is indicated by the pointer SPP value in register 106 being equal to zero and the new value to be gated to register 106 (the value on SPN bus 118) being equal to 15.

Since the MSA register 29 is updated during both a roll out and a roll in routine, bit P latch 218 is reset via OR circuit 221 at the end of either a roll out or a roll in routine by means of a microprogram decode signal on line 180 or 181.

Thus the calculation of the correct starting address for stack area 4 during a roll out routine is $$MSA_N = \text{Modulo}_{16}\,[MSA_0 + 1 - (P \times 16)] + SPP$$

In this equation SPP is the value (between 0 and 15) in register 106. The pointer SPP always indicates the correct displacement within the group of 16 entries in stack 2 at the time roll out is signaled. $MSA_0$ is the value in register 29, whereas $MSA_N$ will be the updated value of MSA to use in addressing stack area 4. P is an indication of the state of bit P latch 218 and is the value one if P line 222 indicates that latch 218 is in the set state, otherwise P = 0. The values P and SPP are gated by microprogram controlled gates (not shown) to the A or B registers 10, 9 in a known manner for performing the calculation.

For the roll in routine the need for an update to MSA register 29 is indicated by bit V latch 223. The resetting or setting of bit V latch 223 is dependent upon whether the pointer SVP value in register 102 does or does not change from zero to one during a push operation.

If compare circuit 225 detects that the SV bus 125 is equal to zero and compare circuit 224 detects that SVN bus 117 is equal to one, then AND circuit 226 indicates that the SVP pointer value will change from zero to one. If this indication occurs during a push operation, AND circuit 202 will reset bit V latch 223 when a microprogram decode signal is applied to the PUSH line 185.

IF AND circuit 226 indicates that the SVP pointer value will change from zero to one, inhibit circuit 227 will inhibit AND circuit 201 and OR circuit 228 from setting bit V latch 223.

If AND circuit 201 is not inhibited by inhibit circuit 227 and AND circuit 212 indicates that a roll out operation will be signaled, then AND circuit 201 and OR circuit 228 will set bit V latch 223. Bit V latch 223 is also set via OR circuit 228 at the end of a roll in routine by way of a microprogram decode pulse on line 181.

Therefore bit V latch 223 is used to remember that an entry was pushed onto stack 2 and this pushing of an entry corresponds to the crossing of a 16-entry boundary.

Therefore the calculation of the correct starting address for stack area 4 during a roll in routine is $$MSA_N = \text{Modulo}_{16}\,[MSA_0 - (V \times 16)] + \text{STP updated}$$

In this equation V is an indication of the state of bit V latch 223 and is the value one if V line 229 indicates that latch 223 is in the set state, otherwise V = 0.

Note that pointer STP, the value (between 0 and 15) in register 101, indicates the entry position in stack 2 that is one less than the position from which the entry was just popped, because the pop operation, which includes the decrementing of register 101 via decrementer circuit 105 and AND circuit 110, is allowed to complete before the roll in routine is started.

Initially registers 29, 101, 102, and 106 are set to the value zero. Furthermore, latches 208, 211, 215, 218 and 223 are initially reset.

A pop operation involves the execution of a microprogram word in the preferred embodiment. One function performed during a pop operation is the transfer of an operand or operator entry from the stack 2 to the B or A registers 9, 10. In the event that the entry is an operator, the entry is gated into the op register 13 by way of the AND circuit 14. In the event that the entry is an operand, it is held in the B or A register 9, 10 until a second operand is stored in the other register 9, 10 and the operator to be executed is in the op register 13. The logical or arithmetic function to be performed on the operand entries is then executed.

The results of the arithmetic or logical function performed on the operands in registers 9 and 10 are transferred into the Z register 12. During a succeeding operation, these results in register 12 are transferred alternatively to the top of stack 2 by a push operation or into the register 9 or 10 via bus 18. In the latter instance where the results are transferred from register 12 to register 9 or 10, the results are used as an entry for the next arithmetic or logical function.

In some instances the entry popped from the stack 2 is the address of data to be stored in the non-stack area of main store 3. In this instance the entry is popped into the B register 9 and the address is then gated to the storage address register 5 of main store 3 by way of the AND circuit **15*b*. A data entry transferred to the A register 10 during a preceding (or succeeding) pop operation is then transferred via bus 21 and AND circuit 16*b* to the selected address in main store 3. Alternatively the address provided to the address register 5 by way of the B register 9 is utilized to read data from the non-stack area of main store 3 into the A register 10. This entry in register 10 is then used in a logical or arithmetic function in accordance with the operator in register 13**.

Addresses popped into the B register 9 for accessing storage 3 also are used to fetch entries from the non-stack area of store 3, which entries are then pushed on stack 2 by way of bus 17.

The roll out routine will now be described in more detail. It will be assumed that when a push operation starts, bit T latch 208 is in the zero (reset) state, and compare equal circuit 115 indicates that STP + 1 = SPP. Thus roll out latch 211 will be set via AND circuits 207 and 212.

Also bit V latch 223 will be reset via AND circuit 202 if AND circuit 226 and compare circuits 224 and 225 indicate that the value of the SVP pointer is going to change from zero to one during the present push operation. Alternatively, the bit V latch 223 is set during this push operation via AND circuit 201 and OR circuit 228 because AND circuit 212 is signaling a roll out routine and inhibit circuit 227 does not inhibit AND circuit 201.

Also if compare equal circuit 113 indicates that SVP = STP + 1, then SVP register 102 will be incremented via incrementer 104 and AND circuits 111 and 114.

Next the STP register 101 is incremented via incrementer 103 and AND circuit 109. Since roll out line 214 indicates that roll out latch 211 has been set, inhibit circuit 122 will inhibit ST bus 119 being gated to address register 27 of stack 2 via AND circuit 23; and instead roll out line 214 enables AND circuit 24 to gate the address value of register 28 (in register 28a) to address register 27. The push data entry, which is in either SDR register 8 or Z register 12, is stored into register 28.

In addition, the line 214 forces a fixed branch address in a store 34 (for storing constants) to the storage address register 33 of the control store 30 to branch to the first microprogram control word of the roll out routine. The first function of the routine is the calculation of $MSA_N$. P line 222 is used to branch to one of two microprogram control words in control store 30, depending on whether the −16 correction is required or not in the calculation of $MSA_N$. The calculation is performed conventionally under microprogram control. The calculated value of $MSA_N$ is inserted into B register 9 to be used in addressing stack area 4 via AND circuit **15*c***.

The first entry of stack 2 to be rolled out is indicated by STP pointer in register 101. This value of the pointer STP is sent to address register 27 of high speed store 1 via AND circuit 190, register 191, line 26, AND circuit 25, and OR circuit 22. A microprogram decode signal on SET STP conductor 192 transfers the point STP into register 191 to start roll out and roll in routine addressing. The entry from stack 2 is moved into A register 10 via bus 20, and stored into stack area 4 via AND circuit **16*a***.

Now the address value in B register 9 is incremented by one and returned to the B register 9. The value of pointer STP in register 191, which is used to access the high speed store 1 via line 26 is also incremented by one via incrementer 193; and the incremented value is returned to the register 191 via AND circuit 196 in response to a microprogram signal on line 184. During the next roll out routine cycle, the next entry is rolled out from stack 2 into A register 10 and is then transferred to stack area 4.

The above series of steps are repeated until sixteen entries have been rolled out from stack 2 to stack area 4.

Then the roll out routine moves then entry from register 28 into stack 2 at the location indicated by STP pointer 101, and also moves the current value of MSA from B register 9 to MSA register 29. The addresses for registers 28 and 29 are provided by the roll out routine via line **26*a*; and a microprogram decode signal on line 198 gates the pointer STP to register 27**.

Finally the roll out routine terminates by resetting roll out latch 211 and by resetting bit P latch 218 via OR circuit 221 and returns to execution of the routine that was in progress before initiation of the roll out routine.

The roll in routine will now be described. It will be assumed that when a pop operation starts, the values in STP and SVP registers 101 and 102 are equal. The equal condition is sensed by compare equal circuit 216 and roll in latch 215 is set via AND circuit 203.

At this time bit P latch 218 is set via AND circuit 206 if bit T latch 208 is in the set condition, as indicated by T line 209, and if compare circuits 219 and 220 indicate that the value of SPP register 106 will change from zero to fifteen as a result of this pop operation.

If compare equal circuit 115 indicates that SPP = STP + 1, the value of STP register 101 will be set into SPP register 106 via AND circuits 116 and 112 if T line 209 indicates that bit T latch 208 is in the set condition.

If compare equal circuit 210 indicates that STP = SPP, bit T latch 208 will be set via AND circuit 204. Finally the pointer STP in register 101 will be decremented via decrementer 105 and AND circuit 110.

The roll in signal on line 217 causes store 34 to supply a branch address to control store 30 for accessing the first microprogram word in the roll in routine. As in the case of the roll out routine, address $MSA_N$ is calculated, using V line 229 to determine if a −16 correction is required or not. The address is then inserted into B register 9 to be used in addressing stack area 4 via AND circuit **15*a*. The calculated value of address $MSA_N$ is also inserted into MSA register 29 to be used as $MSA_0$ during the next roll out or roll in routine. Register 29 is addressed via line 26*a***.

The first entry read from stack area 4 is inserted into stack 2. Stack 2 is addressed via line 26, AND circuit 25, and OR circuit 22 using the value of STP in register 101 which is gated into register 191 by AND circuit 190 and its input line 192.

Now the main store address value in B register 9 is decremented by one; the address value in register 191 is decremented by decrementer 194; and another entry is rolled in from stack area 4 to stack 2. The address value decremented by decrementer 194 is returned to the register 191 via AND circuit 195 in response to a microprogram signal on line 182.

The above series of steps are repeated until 16 entries have been rolled in or no more entries exist in stack area 4. The case where there are not sixteen entries in stack area 4 to roll into stack 2 produces the special case where the pointer SVP in register 102 will not indicate the earliest valid entry in stack 2. This condition will prevail until all entries have been popped from stack 2 or a new entry is pushed into location HS15.

The roll in routine terminates by resetting the roll in latch 215, setting bit V latch 223 via OR circuit 228, resetting bit P latch 218 via OR circuit 221, and returning to execution of the interrupted routine.

FIGS. 3*a*–3*c*, 4*a*–4*d*, 5*a*–5*d*, 6*a*–6*d*, 7*a*–7*f* and 8*a*, 8*b* show the contents of stacks 2 and 4, register 28, MSA register 29, the values of the stack pointers STP, SVP and SPP, and the status of bit latches V, T, and P, for examples of push pop, roll out, and roll in operations. Reference is directed to these figures in conjunction with FIGS. 1, 2*a*, 2*b* for the detailed description of the example described below.

Figures 3A, 3B, 3C:
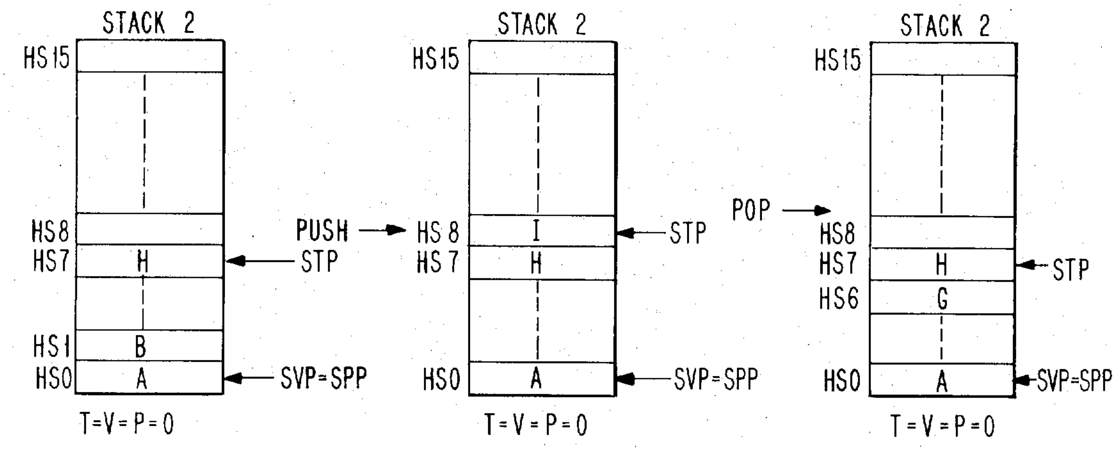
FIGS. 3*a*–3*c*, 4*a*–4*d*, 5*a*–5*d*, 6*a*–6*d*, 7*a*–7*f*, 8*a* and 8*b* illustrate by example push and pop operations and roll out and roll in routines.

Push Operation (FIGS. 3*a*, 3*b*)

The stack top pointer STP initially points to entry H in location HS7 of stack 2 (FIGS. 3*a*). The pointer STP is updated +1 to point to location HS8 during the push operation via AND circuit 109 and incrementing circuit 103. AND circuit 23 gates the updated pointer STP to access the high speed storage 1 and the push data I is stored in location HS8 in stack 2 (FIG. 3b).

Pop Operation (FIG. 3*c*)

During a subsequent pop operation, the data I is popped from the high speed storage location HS8 addressed by the stack top pointer STP. The pointer STP is then decremented by one via AND circuit 110 and decrementer 105 and again points to the next valid entry H in location HS7 on the stack 2.

Roll Out Routine (FIGS. 4*a*–4*d*)

Figures 4A, 4B, 4C:
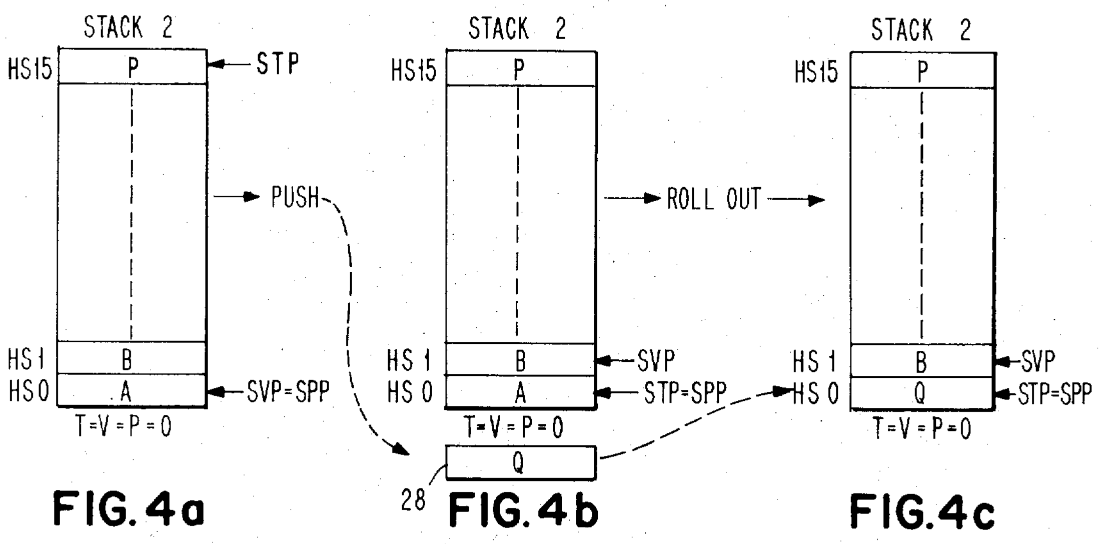

Roll out of the high speed storage stack is delayed until the latest possible time. The conditions to cause a roll out, shown in FIG. 4*a*, are stack full (SPP = STP + 1) which is detected by compare circuit 115 to energize line 121, bit T latch 208 reset at zero at the beginning of the operation, and a push operation is initiated. These conditions produce a signal at the output of AND circuit 212, which sets roll out latch 211 via AND circuit 207 and causes the push data Q to be transferred to register 28. Compare circuit 113 detects that SVP = STP + 1, so SVP pointer 102 is incremented via AND circuits 111 and 114 and incrementer 104. The stack top pointer STP is incremented via AND circuit 109 and incrementer circuit 103 as in the normal push operation. See FIG. 4*b*.

The roll out routine is initiated by branching to the first control word of the routine in store 30 in response to the signal on roll out line 214. The roll out routine initially calculates the value of $MSA_N$ (modulo$_{16}$ [0 + 1 − (0 × 16)] + 0 = 0) and moves this value to B register 9. The first data entry A in stack location HS0 addressed by the value in register 191 via line 26 is rolled out to store 3 location MS0 (FIG. 4*d*) via bus 20, A register 10, bus 21, and AND circuit 16*a* as shown in FIG. 1. The rolled out data entry is stored in the slow speed storage stack area 4 in the location MS0 identified by the address value in register 9.

Figure 4D:
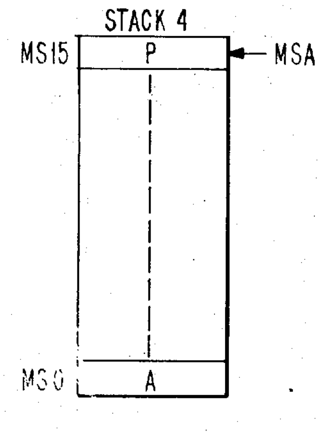

Additional entries B–P are rolled out in the same manner, and the values in B resister 9 and on bus 26 are updated by ALU 11 and incrementer 193 for each entry until the 16 entries A–P have been rolled out. FIG. 4d shows the contents of stack area 4 after all entries have been rolled out; and the final pointer value (MSA = 15) is returned to the MSA register 29 in store 1. Then the roll out routine moves the entry Q in register 28 to the stack 2 location indicated by the STP pointer, as shown in FIG. 4*c*, and terminates by resetting bit P latch 218 via OR circuit 221. The routine supplies the address of register 28 to AND circuit 24 via bus 26*b*. A pulse on line 198 gates the pointer STP from register 101 into AND circuit 23 to access the stack 2 location.

Figure 5A:
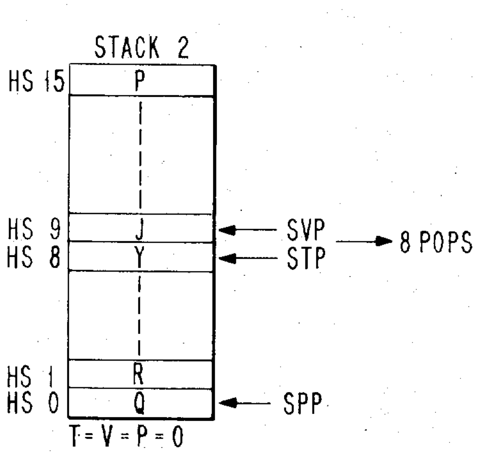

FIG. 5*a* shows the results of having pushed eight more entires (R–Y) onto stack 2 after Q had been pushed into location HS0, FIG. 4*c*. It can be seen that the pointer SVP has been pushed ahead of the pointer STP because during each push operation compare circuit 113 detected that STP + 1 = SVP, and therefore SVP was incremented on each push via incrementer 104 and AND circuits 111 and 114.

Figure 5B:
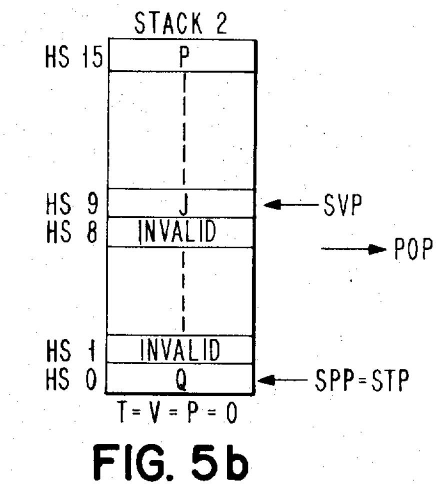

FIG. 5*b* shows the result of now performing eight successive pop operations. The SVP pointer has not moves and is still indicating the earliest entry J in stack 2 that has a duplicate copy in stack area 4. Also the SPP pointer has not moved and is indicating the earliest entry Q in stack 2 that does not have a duplicate copy in stack area 4.

Figure 5C:
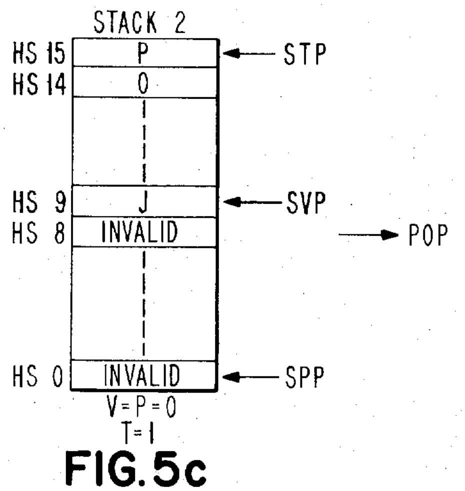

FIG. 5*c* shows the result of doing another pop operation. The pointer STP in register 101 has been decremented via AND circuit 110 and decrementer 105. Since compare equal circuit 210 detected that STP = SPP before STP was decremented, bit T latch 208 was set via AND circuit 204. The bit T latch 208 will therefore inhibit the roll out latch 211 from being set on a subsequent push operation, even though C line 121 will indicate that STP + 1 = SPP.

Figure 5D:
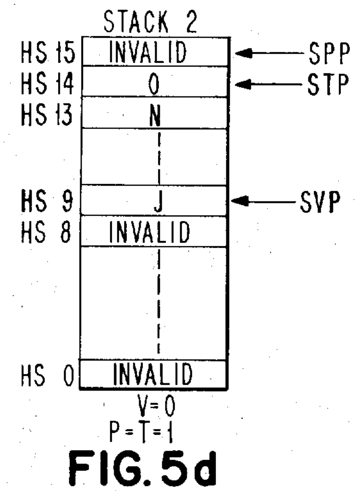

FIG. 5*d* indicates the result after another pop operation. The pointer STP is decremented normally. Compare equal circuit 115 detected that, before STP was decremented, STP + 1 = SPP. Therefore the non-decremented value of STP is set into SPP register 106 via AND circuits 112 and 116, as T line 209 indicates that bit T latch 208 is in the set state, giving the effect of decrementing the SPP pointer by one.

Compare circuits 219 and 220 indicate that as a result of this pop operation, the value of the pointer SPP will change from 0 to 15. Since bit T latch 208 is also in the set state, bit P latch 218 will be set via AND circuit 206. Therefore bit P latch 218 is remembering the boundary crossing of the SPP pointer.

Roll In Routine (FIGS. 6*a*–6*d*)

Figure 6A:
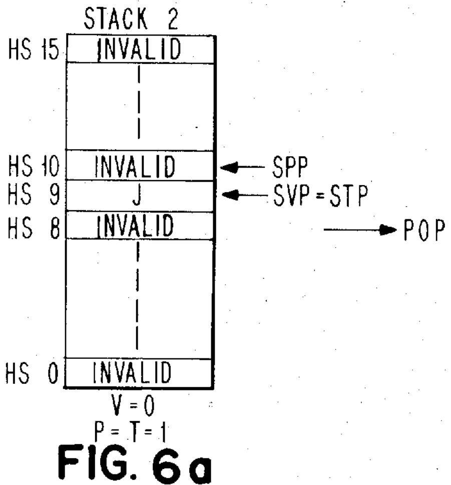

Five more pop operations (starting with the conditions of FIG. 5*d*) will produce the result shown in FIG. 6*a*, the initial conditions for initiating a roll in. Stack 2 has one valid entry J in location HS9 and SVP = STP.

Figure 6B:
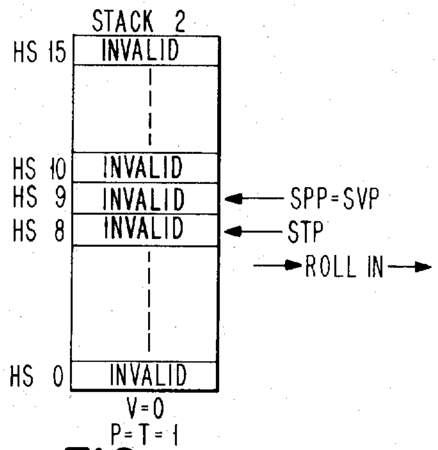

If the next operation is a pop operation, entry J is popped from location HS9 and roll in latch 215 will be set via AND circuit 203 as compare equal circuit 216 indictes that SVP = STP. The STP and SPP pointers are both decremented normally, as shown in FIG. 6*b*, and the roll in routine from store 30 is initiated.

The roll in routine first calculates $MSA_N$. The $MSA_0$ value is obtaied from MSA register 29 and is equal to 15, as shown in FIG. 4*d*. Bit V latch 223 is in the reset state, indicating that a −16 correction is not required, and the STP pointer value is eight. Thus the calculation is $$MSA_N = \text{Modulo}_{16} [15 - (0 \times 16)] + 8$$
$$= 0 + 8$$
$$= 8$$

The pointer STP is transferred from register 101 to register 191 via AND gate 190 in response to a microprogram decode control signal on line 192.

This value for $MSA_N$ is moved to both the MSA register 29 and B register 9. The value in the B register 9 is gated, via AND circuit 15*a*, to SAR 5 of main store 3. The entry I addressed in stack area 4 (see FIG. 6*d*) is moved, via bus 17, to the entry location HS8 of high speed stack 2 addressed by pointer STP in register 191 via bus 26.

The roll in routine updates the addresses in registers 9 and 191. Entry H is then transferred from location MS7 to location HS7. The routine similarly transfers entries G–A from locations MS6 – MS0 to locations HS6 – HS0, entry by entry. The routine then terminates anad transfers control to the program being executed at the time the roll in routine was initiated.

Upon termination, the roll in routine sets bit V latch 223 via OR circuit 228 and resets bit P latch 218 via OR circuit 221. See FIG. 6*c*.

Figure 6C:
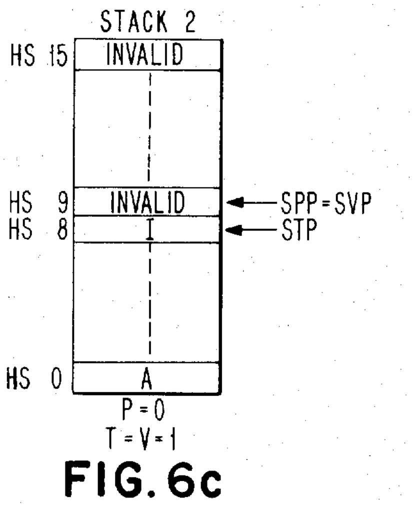
Figure 6D:
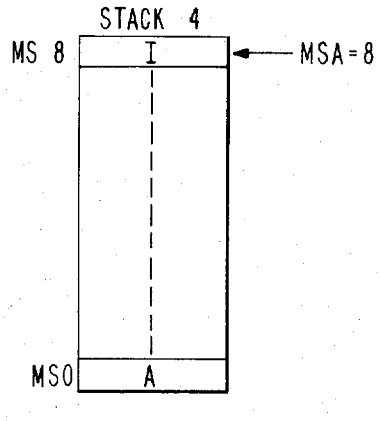

FIG. 6*d* shows stack area 4 of main store 3 after the termination of the roll in routine.

Figure 7A:
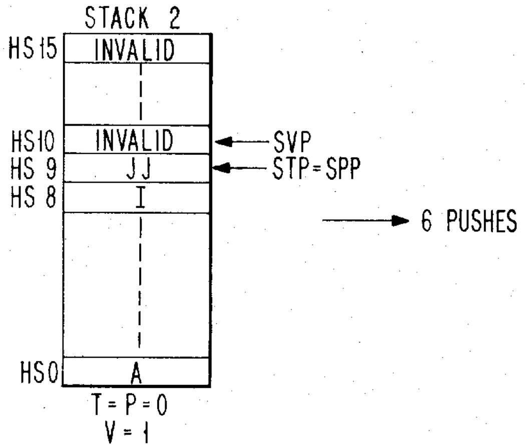

FIG. 7*a* shows the result of a push operation on the stack 2 configuration of FIG. 6*c*. Pointers STP and SVP have been incremented normally. Note that the SPP pointer indicates the earliest entry (JJ at location HS9) in stack 2 that does not have a duplicate copy in stack area 4. Also this push operation has reset bit T latch 208 via AND circuit 205 because line C 121 indicated that SPP = STP = 1.

Figure 7B:
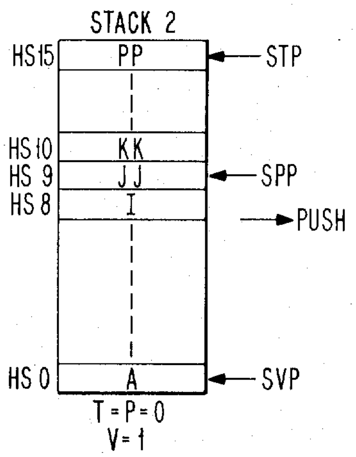
Figure 7C:
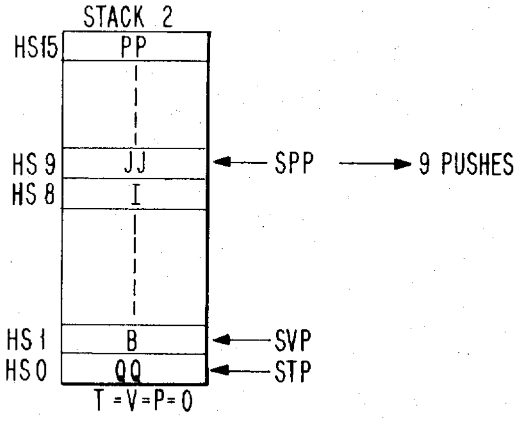

FIG. 7*b* shows the result of six more push operations on stack 2 of FIG. 7*a*. Another push operation produces the result shown in FIG. 7*c*. On all push operations pointers STP and SVP were incremented normally. The push operation resulting in FIG. 7*c* reset bit V latch 223 via AND circuits 202 and 226 because compare circuits 224 and 225 indicated that the SVP register 102 would change from zero to one as a result of this push operation. Thus bit V latch 223 is remembering the boundary crossing of the STP pointer, if a subsequent roll in routine is required.

Figure 7D:
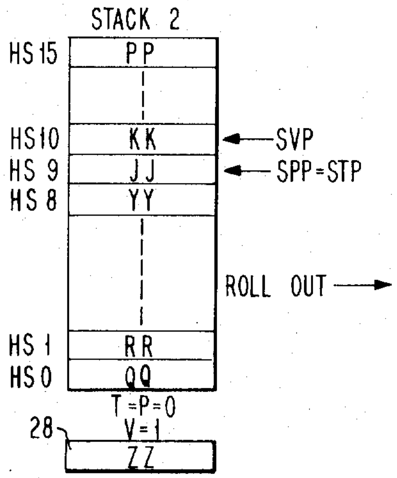

FIG. 7*d* indicates the results after 9 more push operations. STP and SVP have again been incremented normally. The last push operation caused the data (ZZ) to be stored into register 28.

Since the last push operation also set roll out latch 211 and the SVP register 102 did not change from zero to one, bit V latch 223 is set via AND circuit 201 (which is not inhibited by inhibit circuit 227) and OR circuit 228.

Before roll out can start, $MSA_N$ must be calculated. As shown in FIG. 6*d*, the value for $MSA_0$ is 8. The SPP pointer value is 9 and bit P latch 218, being in the reset state, indictes that a −16 correction is not required. Thus the calculation is $$MSA_N = \text{Modulo}_{16} [8 + 1 - (0 \times 16)] + 9$$
$$= 0 + 9$$
$$= 9$$

As shown in FIG. 6*d* the correct value to use in addressing stack area 4 of main store 3 has been calculated and the normal rolling out of stack 2 entries can commence.

Figure 7E:
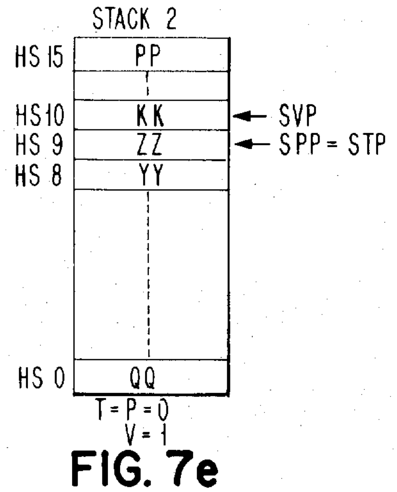
Figure 7F:
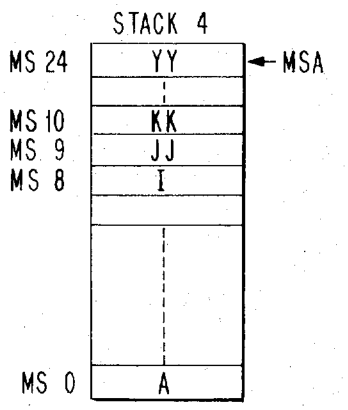

FIGS. 7*e* and 7*f* show the states of high speed stack 2 and main store stack 4 after the roll out of entries JJ–YY to locations MS9 — MS24 inclusive.

Figure 8A:
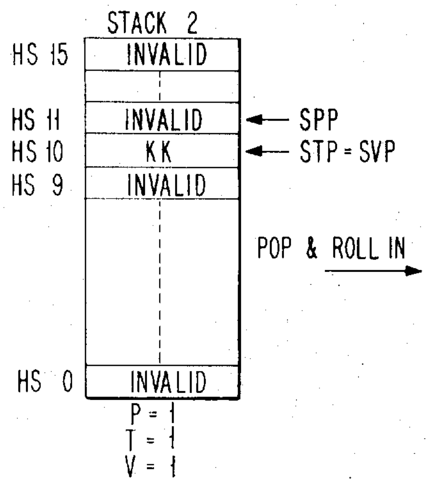

If fifteen pop operations are then executed to remove entries ZZ to LL inclusive from stack 2, the condition shown in FIG. 8*a* exists. The only remaining valid entry is KK in location HS10. The pointer SVP did not get updated during the pop operations. However, the pointer STP was decremented during each pop operation; and the pointer SPP followed the pointer STP (i.e., SPP was decremented) during all but the first of the 15 pop operations.

One additional pop operation removes entry KK from stack 2 and initiates a roll in routine to transfer entries JJ–A from locations MS9 – MS0 to locations HS9–HS0. The calculation of the initial main store address is as follows:

$$MSA_N = \text{Modulo}_{16} [24 - (1 \times 16)] + 9$$
$$= \text{Modulo}_{16} [8] + 9$$
$$= 0 + 9$$
$$= 9$$

Figure 8B:
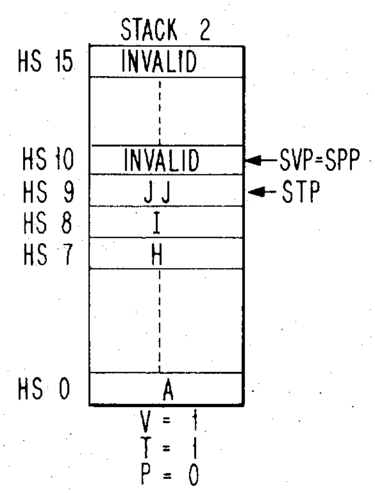

FIG. 8*b* shows stack 2 after the roll in.

While the invention has been particularly shown and described with reference to a preferred embodiment thereof, it will be understood by those skilled in the art that various changes in form and details may be made therein without departing from the spirit and scope of the invention.

We claim:

1. In a system having means including a stack and a slower speed store for directly executing algorithmic type problem programs of the type in which means transfers data entries into and removes entries from the stack for processing in a last-in-first-out order and in which means roll overflow entries out to the slower speed store when the stack is full and roll overflow entries into the stack when the stack is empty, the combination with the stack and slower speed store of means including pointer registers for permitting the removal of each entry in the stack from the stack for processing after a copy of said entry has been rolled out to the slower speed store but not rolled back to the stack.

2. The combination of claim 1 together with additional means including said registers for permitting a new entry to overlay one of said entries in the stack which has a copy in the slower speed store.

3. In a data processing system for directly executing algorithmic type problem programs, the combination comprising a stack having registers for storing entries, first means for transferring entries into the stack and for removing them from the stack for processing in last-in-first-out order, a store operable at a slower speed than the stack for storing overflow copies of said entries from the stack, second means for rolling out all entries in the stack from the stack to the slower speed store only when all of the stack registers are full of entries having no copies in the slower speed store, and third means for rolling in copies of said rolled out entries from the slower speed store to the stack only when the stack registers are (1) empty of entries with copies in the slower speed store and (2) empty of entries without copies in the slower speed store, program responsive means for rendering said first means effective to remove a stack entry from the stack for processing when said latter entry has a copy in the slower speed store, and program responsive means rendering said first means effective to overlay an entry in the stack with a new entry when the latter entry has a copy in the slower speed store.

4. The combination of claim 3 wherein the second means further comprises first and second registers respectively storing stack address indicia pointing to the most recently received entry in the stack and to the least recently received entry in the stack having no copy in the store, and means for initiating roll out if the address indicia in the registers become equal when a new entry is received for transfer to the stack.

5. The combination of claim 4 wherein the third means further comprises said first register, a third register storing stack address indicia pointing to the least recently received entry in the stack, and means for initiating roll in when the address indicia in the first and third registers are equal and said least recently received entry is removed for processing.

6. The combination of claim 5 further comprising means storing status bit information, and said second and third means including store address calculation means responsive to said status information for determining which of two address groups to use during roll out and roll in.

7. In a data processing system having a processor and a stack for storing operand and/or operator entries immediately preceding processing of the entries, the combination with said processor and stack of first means for transferring the entries into the stack and for transferring the entries from the stack directly to the processor for processing in a last-in-first-out sequence, a store operable at a slower speed than the stack for storing overflow entries from the stack, second means for rolling out said overflow entries from the stack to the slower speed store when the stack is full and for rolling in said overflow entries from the store to the stack when the stack becomes empty, means for overlaying entries stored in the stack with new entries only when the stored entries have copies in the slower speed store, pointer registers, means for maintaining in the pointer registers address indicia pointing to the stack addresses storing the last received entry in the stack, the earliest received entry which is valid in the stack, and the earliest received entry in the stack for which there is no copy in the slower speed store, and means controlled by said address indicia for maintaining all overflow entries in the stack valid and available for processing after a copy of the last-mentioned entries has been rolled out to the store until the said last-mentioned entries are either transferred to the processor or overlaid by new entries.

* * * * *